US008452722B2

(12) United States Patent  
Naeve et al.

(10) Patent No.: US 8,452,722 B2  
(45) Date of Patent: May 28, 2013

(54) METHOD AND SYSTEM FOR SEARCHING MULTIPLE DATA SOURCES

(75) Inventors: Nis Boy Naeve, Wiesloch (DE); Ioannis Grammatikakis, Leimen (GR)

(73) Assignee: SAP AG, Walldorf (DE)

( * ) Notice: Subject to any disclaimer, the term of this patent is extended or adjusted under 35 U.S.C. 154(b) by 1693 days.

(21) Appl. No.: 10/340,556

(22) Filed: Jan. 10, 2003

(65) Prior Publication Data

US 2003/0233351 A1 Dec. 18, 2003

Related U.S. Application Data

(60) Provisional application No. 60/347,438, filed on Jan. 11, 2002.

(51) Int. Cl.
*G06F 17/00* (2006.01)
*G06F 17/30* (2006.01)

(52) U.S. Cl.
CPC ............... *G06F 17/30592* (2013.01)
USPC ....................................... 707/602

(58) Field of Classification Search
CPC ............................... G06F 17/30592
USPC ............ 707/3, 10, 102, 600, 601, 602, 705, 707/707/706, 736, 790, 803
See application file for complete search history.

(56) References Cited

U.S. PATENT DOCUMENTS 5,845,278 A * 12/1998 Kirsch et al. ............ 707/3
6,594,654 B1 * 7/2003 Salam et al. ............ 707/3
6,732,091 B1 * 5/2004 Middelfart ............ 707/3

OTHER PUBLICATIONS

Chaitanya Baru et al, "The SDSC Storage Resource Broker", 1998, ACM, p. 1-12.*
Ooi, B. C., Zhao, C., and Lu, H. 1994. DUET—a database user interface design environment. J. Intell. Inf. Syst. 3, 3-4 (Jul. 1994), 331-355.*

* cited by examiner

*Primary Examiner* — Kamini S Shah
*Assistant Examiner* — Luke Osborne
(74) *Attorney, Agent, or Firm* — Finnegan, Henderson, Farabow, Garrett & Dunner, LLP

(57) ABSTRACT

In a method and system for searching multiple data sources for objects with certain attributes, wherein the data sources potentially have different data formats, the searching is done by first reading the data in the data sources, storing the data, and then searching the stored data. The method and system preferably includes a user interface with a template for displaying data from data sources, for manually supplementing the data, and for defining search criteria.

21 Claims, 4 Drawing Sheets

METHOD AND SYSTEM FOR SEARCHING MULTIPLE DATA SOURCES

CROSS-REFERENCE TO RELATED APPLICATION

This application claims priority based on Provisional U.S. Patent Application No. 60/347,438 filed Jan. 11, 2002, the disclosure of which is incorporated here by reference in its entirety.

BACKGROUND OF THE INVENTION

In industry it is often necessary to locate persons or other objects with certain attributes or qualifications. Unfortunately the information or data about the object is not necessarily located in one easily searchable location. Typically information for these objects is stored in data bases and other data structures which are not only distributed but also have different formats. This is illustrated in FIG. 1 in which some data about an object 100 is stored in a relational database, some data is found in a structured data file 104, some takes the form of free text which may be in a separate storage location 106, and yet other data or information about the object 100 may be found in another data format 108 which may be in yet another storage facility. Thus, for example, when searching for objects like employees with certain qualifications, some employee data my be located in a human resource (HR) relational data base while additional employee data may be located in a directory having a hierarchical file format. Furthermore some information about the employee may exist as free text.

In order to locate a specific object (in this example, an employee with certain qualifications), one therefore has to interrogate each of the data sources in turn, as shown in FIG. 1, in which the search request 110 is interpreted and then presented as separate search requests 120, 122, 124, 126 to the various data sources. One approach proposed in the past was to search one of the data sources and use the feedback as part of the input to the next data source. Another approach simply searched each data source independently and then gathered and coordinated the information received from the various data sources. As will be appreciated, this requires significant effort and time, and can become prohibitive as the number of objects and the amount of data associated with each object increases.

Furthermore, data sources may not necessarily include all relevant information. They may for instances have empty fields or fail to include certain attributes about the object even though these constitute relevant data when searching for appropriate objects.

The present invention seeks to address the above problems.

SUMMARY OF THE INVENTION

The invention relates to a method and a system for identifying relevant objects based on desired attributes associated with the objects, wherein the attribute data is located in a plurality of data sources. The data sources may be in different locations and may store data in different formats. The method includes reading the data from the data sources, preferably storing the data, and searching the data. The data may be stored in a file or data base, and is preferably stored as an XML file. The reading of the data from the various data sources may be done through remote function calls (RFCs). The stored data is typically searched by means of a search engine which may make use of fuzzy searching techniques to take account of spelling variances, synonyms, and various other linguistic differences. In order to accommodate different languages, a key may be associated with the data in the data source. To allow specific types of data to be searched, the data in at least one of the data sources may be allocated to different fields, for example, through the use of tags.

In order to allow additional information to be provided about an object, that is not otherwise available from one of the data sources, the present invention includes a template driven user interface that defines pre-defined fields and a free text area.

DETAILED DESCRIPTION OF THE INVENTION

Figure 1:
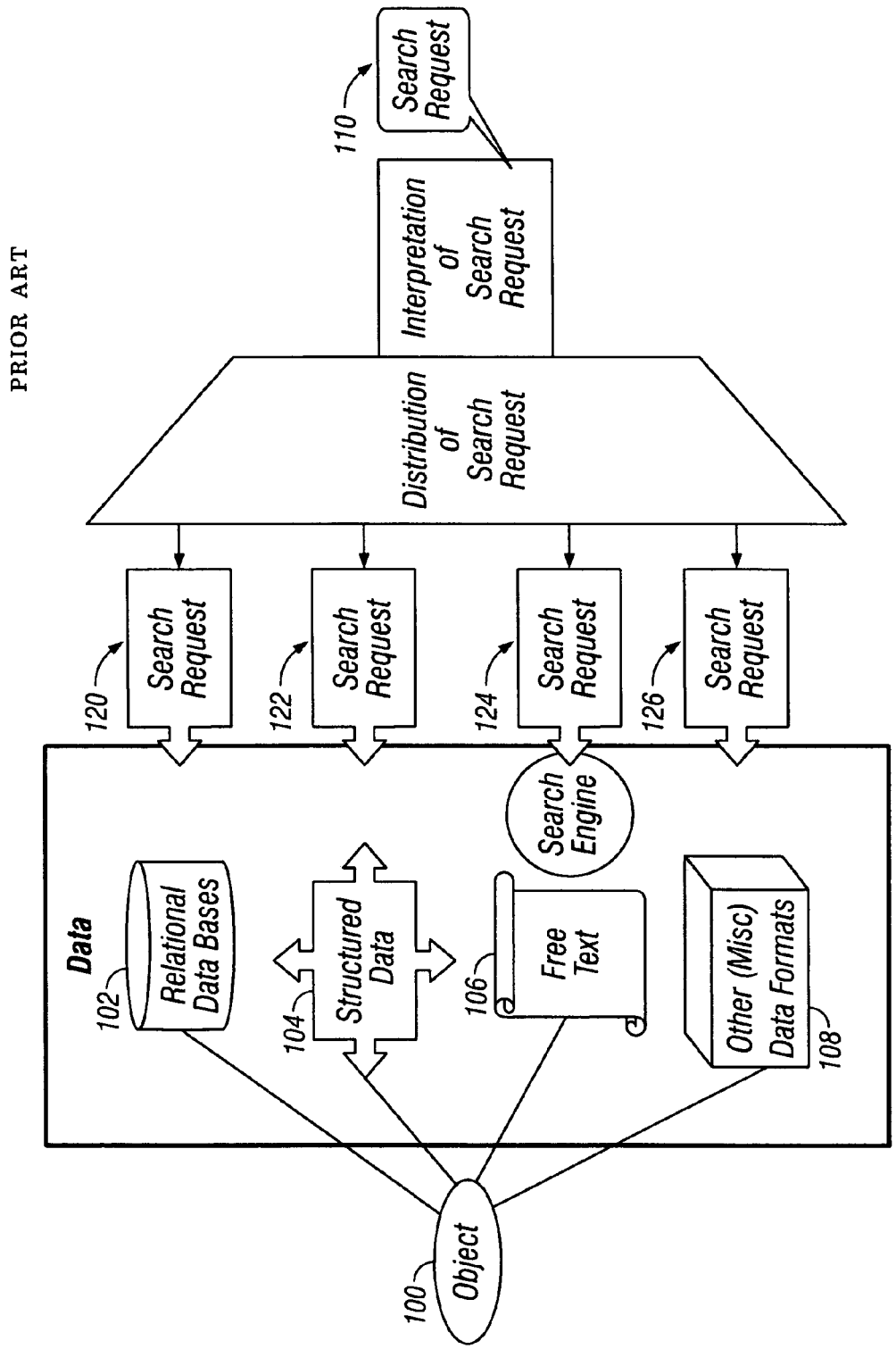
FIG. 1 is representation of a prior art search scenario through multiple data sources.
Figure 2:
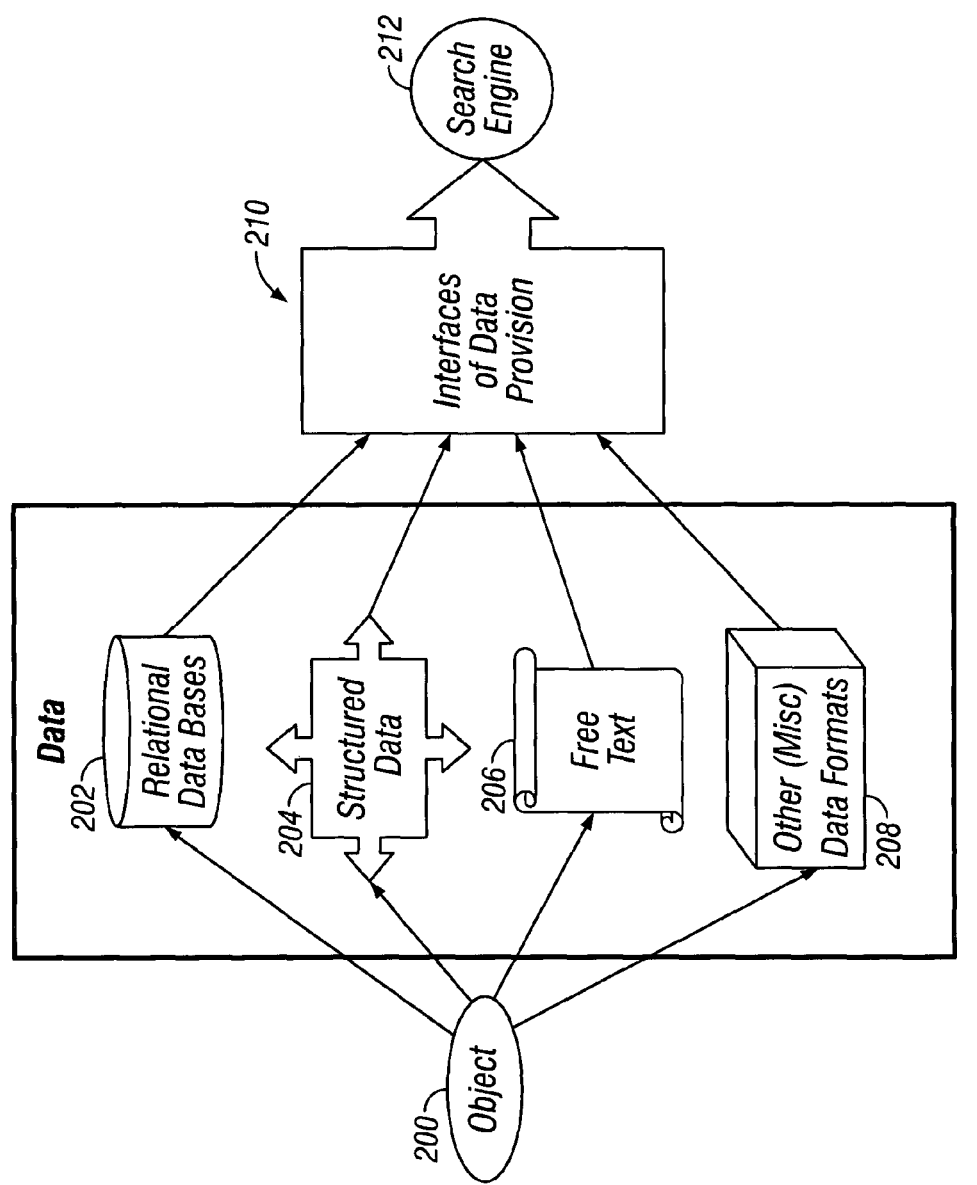
FIG. 2 is a representation of one embodiment of a search scenario through multiple data sources in accordance with the invention.

FIG. 2 shows a representation of one embodiment of the invention. An object 200, such as a particular employee in a corporation, has particular attributes and qualifications such as education, experience, contact details, location (if the corporation has various offices, for instance), title, etc. This information is stored in various data sources which can have different formats and can be in one physical location or be distributed over different machines. In this embodiment, data associated with the object 200 is located in a relational data base 202, a structured data file 204 which could take the form of a hierarchical file system such as LDAP used by SAP, a data source storing free text 206, and other data formats or sources indicated generally by reference numeral 208. It will be appreciated that typically numerous objects with associated data are stored in the various data structures.

Instead of directing searches to each of the data structures in turn, the present invention reads the data by providing for interfaces to the various data structures. In one embodiment the reading simply comprises a remote function call (RFC) to each of the data sources. The read data is stored, as indicated by reference numeral 210. In one embodiment, the read data is stored in an XML file which is then readable by a search engine 212. It will be appreciated that the read data could also be stored in a different format, such as a database. However, the XML file format has the flexibility of easily allowing fields to be added, deleted or updated.

The present invention thus provides an elegant way of searching attributes from numerous data sources at the same time and avoids putting additional loads on the various data sources each time a search is performed.

Since information stored in data sources is not always complete or also lacks the flexibility of capturing ad hoc information that is best included in free text format, the present invention, further contemplates providing means for adding free text. In one embodiment, this is done by means of a template driven user interface that defines data fields, some of which may be populated by data from one or more of the data sources, and some may be filled in by a user by any one of a number of means, e.g., by selecting from a menu or by entering text.

Figure 3:
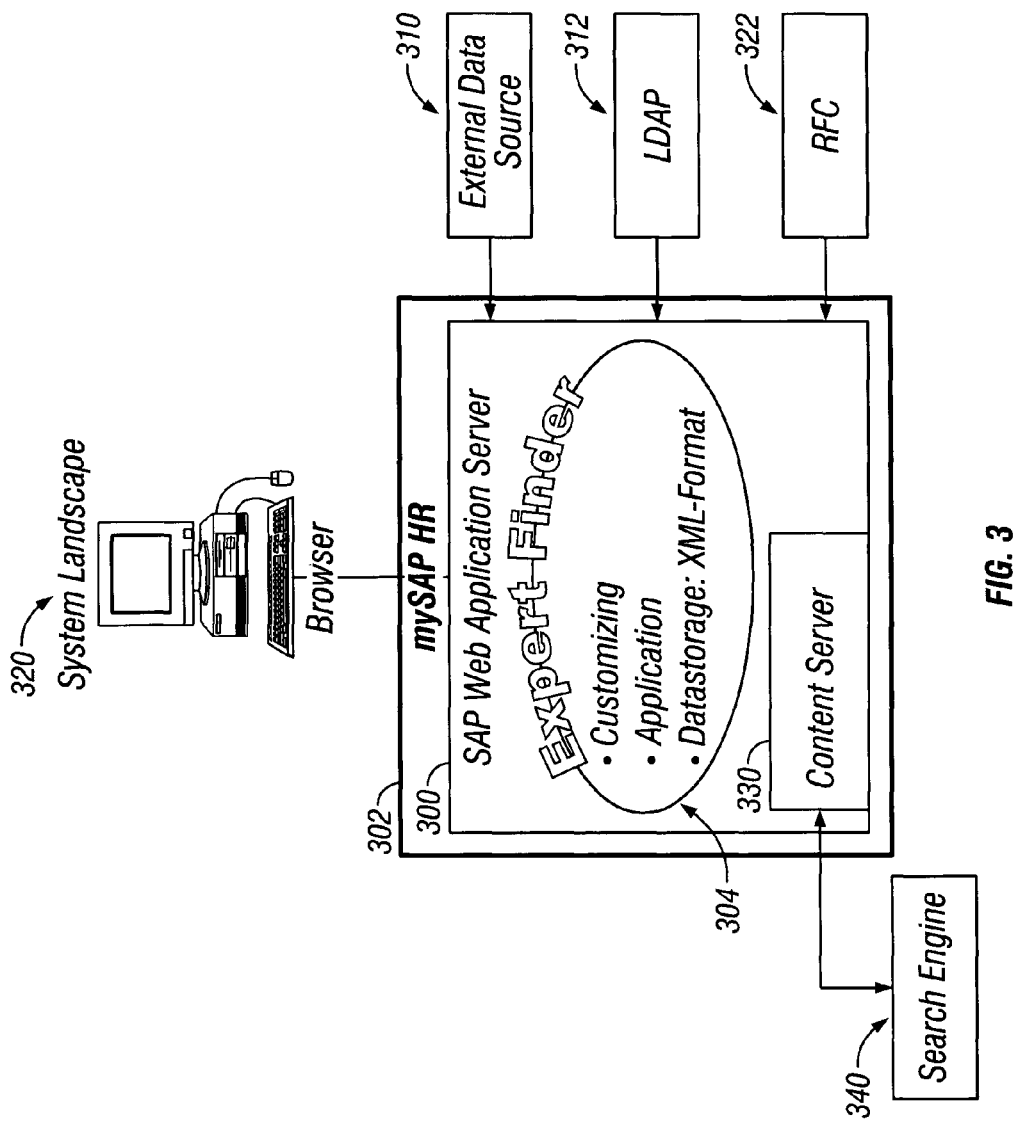
FIG. 3 is a block diagram of one implementation of the invention.

FIG. 3 shows one particular implementation of the invention, which shows an application server 300, which in this embodiment, forms part of an HR system 302. The application server 300 includes a data storage 304 for storing incoming data in an XML file. As is shown in FIG. 3, the application server 300 may be part of the HR system or, alternatively, HR data may be provided from an external data source 310. Thus data is supplied both automatically from data sources such as the HR data base 310 and a hierarchical file storage 312, as well as by manual entering of information using the user interface 320. Other data sources could additionally be integrated using remote function calls (RFC) interface 322. All the data from the various data sources is transferred to the application server so that the XML file 304 can be populated and stored in the content server 330 as well as allow the corresponding fields to be visualized in a template. This is best illustrated by the embodiment of a template shown in FIG. 4.

Figure 4:
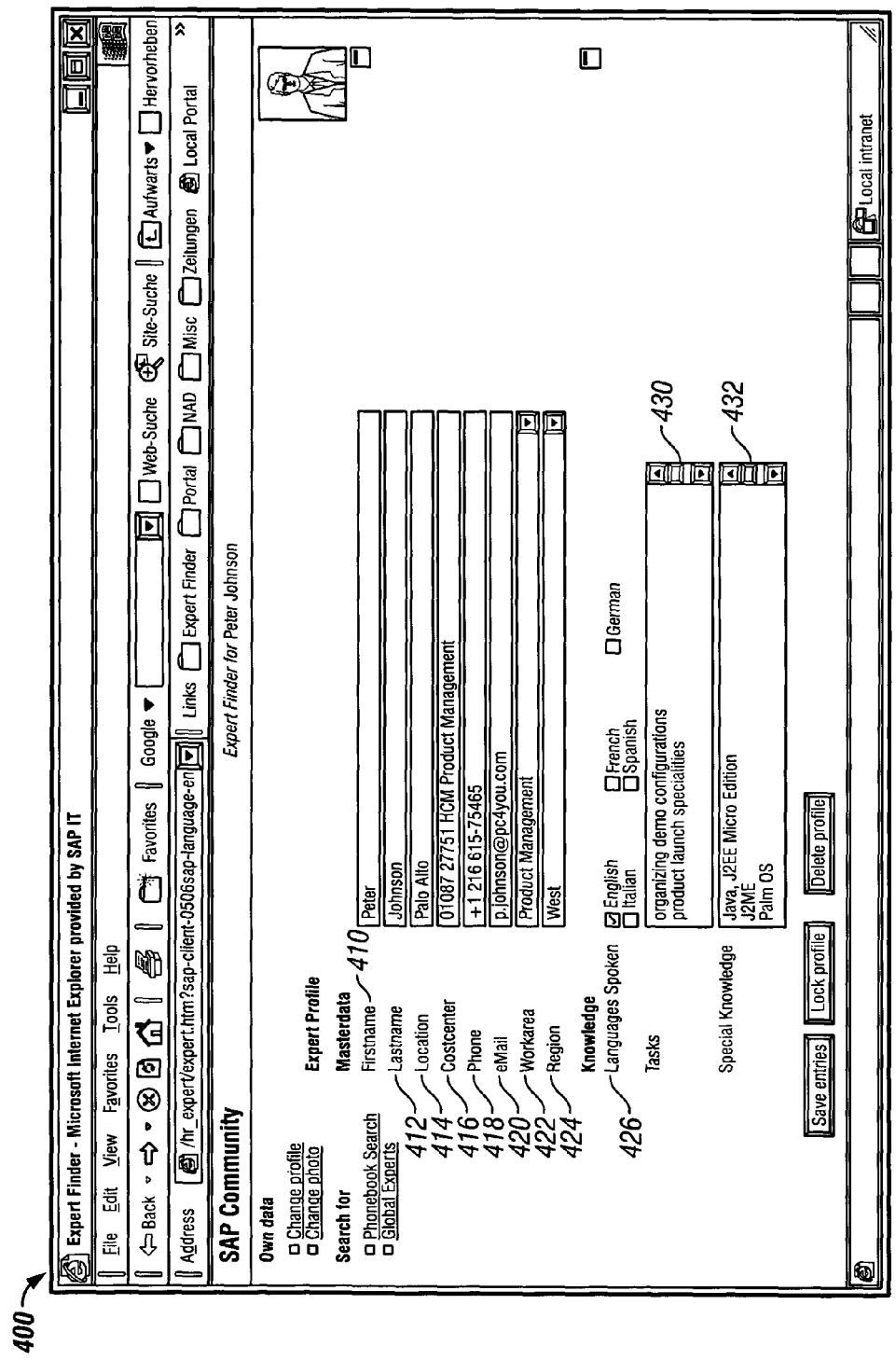
FIG. 4 shows one embodiment of a data entry template.

FIG. 4 shows a template 400 which, in this embodiment is Web based. The template 400 includes data entry fields such as Firstname 410, Lastname 412, Location 414, Costcenter 416, Phone 418, and eMail 420, which are populated from the hierarchical database 310 and stored in the XML file 304. It also includes fields that are filled out by a user, such as the fields Workarea 422 and Region 424, which provide drop down menus for easy selection of entries by the user. It also includes other selection fields such as Languages Spoken 426, as well as free text data entry locations 430, 432. The latter two fields provide the user with the flexibility of entering information that is not necessarily common to other employees but which is nevertheless relevant in identifying an employee with specific attributes.

Referring again to FIG. 3, the search engine 340 communicates with the content server 330 to extract objects (in this case, employees) with defined attributes. The content server, in turn interacts with the data entry system to save any additional data that is entered by a user, in the XML file. In one embodiment a separate XML file is provided for each object. However, it will be appreciated that the filing system can be set up in different ways.

In one embodiment, the different fields are defined to allow searches to be conducted in specific fields only instead of searching through the full XML files. To define the various fields, tags are associated with the fields and are included as part of the data.

The data fields of the template are also used to design the search interface when searching for objects. Thus it prompts the user to enter the search criteria in the selected data fields that are relevant to the user, and invokes the search engine 340 to search the XML files 304. In one embodiment the search engine 340 uses fuzzy logic to allow spelling variances, and synonyms to be picked up during a search.

As yet a further refinement, in one embodiment, keys are included as part of some or all of the data to provide greater search flexibility. For example, when a user selects "English" in the Languages Spoken field 426, this would not necessarily be picked up if this search element were typed in in German or Spanish, since the word "English" is spelled differently in these languages and would not be recognized. However, by including a key EN (for instance, by way of a tag) and attaching it to the field, the selection of the field automatically invokes the key notwithstanding that the field may be identified to the human user as English, Englisch, or Anglais.

While the invention has been described with reference to particular embodiments and applications, it will be appreciated that the invention can be implemented in different ways and have different applications without departing from the scope of the invention.

What is claimed is:

1. A method of searching for an object, the method comprising:
   reading the object from one or more data sources, wherein the object comprises attribute data;
   storing the object comprising the attribute data in a file;
   adding a tag to a portion of the attribute data, wherein the tag associates the portion of attribute data with an entry field in a template; and
   searching the attribute data of the file using the template, further comprising:
      receiving search criteria in the entry field;
      identifying, by the tag, the portion of attribute data in the file that corresponds to the entry field; and
      searching the portion of attribute data in the file with the search criteria to identify the object;
   wherein;
   the template includes a data entry portion that allows the user to enter attribute data into the file by using entry fields; and
   the searching is done using a search engine capable of performing fuzzy searches to identify spelling variances and synonyms to be included as results during the searching.

2. The method of claim 1, wherein the file is an XML file.

3. The method of claim 1, wherein the attribute data is stored in a plurality of formats.

4. The method of claim 3, wherein the plurality of formats include relational databases, hierarchical data structures, and free text.

5. The method of claim 1, wherein the entering of the attribute data by the user includes at least one of selecting from data choices and adding free text.

6. The method of claim 1, further comprising entering search criteria into the template by defining attribute data of one or more objects to be searched.

7. The method of claim 6, further comprising associating keys with at least some of the attribute data, wherein the keys are selectable from data choices in the template.

8. The method of claim 1, wherein reading the attribute data includes performing a remote function call.

9. The method of claim 1, wherein the attribute data of the object is distributed over a plurality of the data sources.

10. The method of claim 1, wherein the object is a first object, the attribute data is first attribute data, and the file is a first file, the method further comprising:
    reading a second object, different from the first object, from the one or more data sources, wherein the second object comprises second attribute data;
    storing the second object with the second attribute data in a second file, different from the first file;
    adding the tag to a portion of the second attribute data, wherein the tag associates the portion of second attribute data with the entry field in the template;
    identifying, by the tag, the portion of the first attribute data in the first file and the portion of the second attribute data in the second file;
    searching the portion of the first attribute data in the first file and the portion of the second attribute data in the second file with the search criteria;
    displaying the first object in the template if the search criteria matches the portion of the first attribute data; and
    displaying the second object in the template if the search criteria matches the portion of the second attribute data.

11. The method of claim 1, wherein the object comprises biographical and qualification data of an employee.

12. A system for searching for an object, the system comprising:
- means for reading the object from one or more data sources, wherein the object comprises attribute data;
- means for storing the object comprising the attribute data in a file;
- means for adding a tag to a portion of the attribute data, wherein the tag associates the portion of attribute data with an entry field in a template;
- means for searching the attribute data of the file using the template, further comprising:
- means for receiving search criteria in the entry field;
- means for identifying, by the tag, the portion of attribute data in the file that corresponds to the entry field; and
- means for searching the portion of attribute data in the file with the search criteria to identify the object;

wherein:
- the template includes a data entry portion that allows the user to enter attribute data into the file by using entry fields; and
- the means for searching is done using a search engine capable of performing fuzzy searches to identify spelling variances and synonyms to be included as results during the searching.

13. The system of claim 12, wherein the attribute data is stored in a plurality of formats.

14. The system of claim 13, wherein the plurality of formats include relational databases, hierarchical data structures, and free text.

15. The system of claim 12, wherein the entering of the attribute data by the user includes at least one of selecting from data choices and adding free text.

16. The system of claim 12, further comprising means for entering search criteria into the template by defining attribute data of one or more objects to be searched.

17. The system of claim 16, further comprising means for associating keys with at least some of the attribute data, wherein the keys are selectable from data choices in the template.

18. The system of claim 12, wherein reading the attribute data includes performing a remote function call.

19. The system of claim 12, wherein the attribute data of the object is distributed over a plurality of the data sources.

20. The system of claim 12, wherein the object is a first object, the attribute data is first attribute data, and the file is a first file, the system further comprising:
- means for reading a second object, different from the first object, from the one or more data sources, wherein the second object comprises second attribute data;
- means for storing the second object with the second attribute data in a second file, different from the first file;
- means for adding the tag to a portion of the second attribute data, wherein the tag associates the portion of second attribute data with the entry field in the template;
- means for identifying, by the tag, the portion of the first attribute data in the first file and the portion of the second attribute data in the second file;
- means for searching the portion of the first attribute data in the first file and the portion of the second attribute data in the second file with the search criteria;
- means for displaying the first object in the template if the search criteria matches the portion of the first attribute data; and
- means for displaying the second object in the template if the search criteria matches the portion of the second attribute data.

21. The system of claim 12, wherein the object comprises biographical and qualification data of an employee.

* * * * *